E. C. WADDINGTON.
COMBINED CUTTER AND SCRAPER.
APPLICATION FILED FEB. 18, 1919.
1,347,237.
Patented July 20, 1920.
2 SHEETS—SHEET 1.
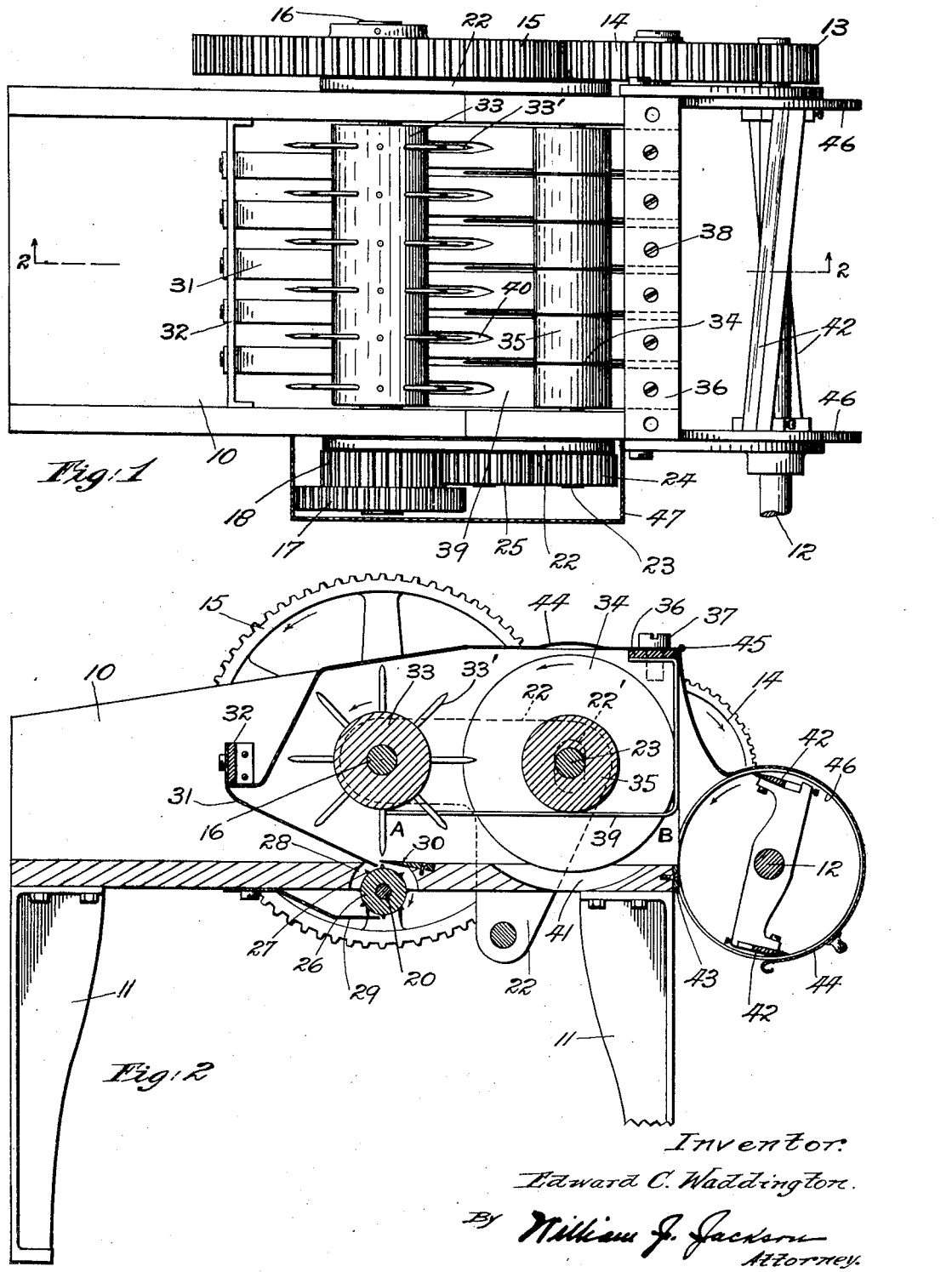
Inventor:
Edward C. Waddington.
By William J. Jackson
Attorney.

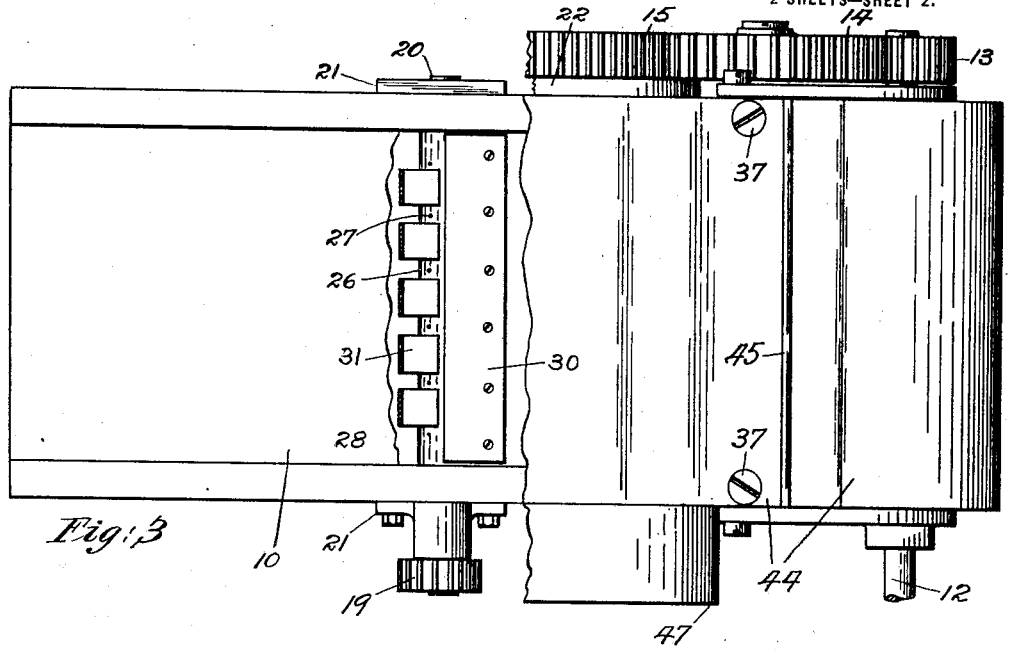
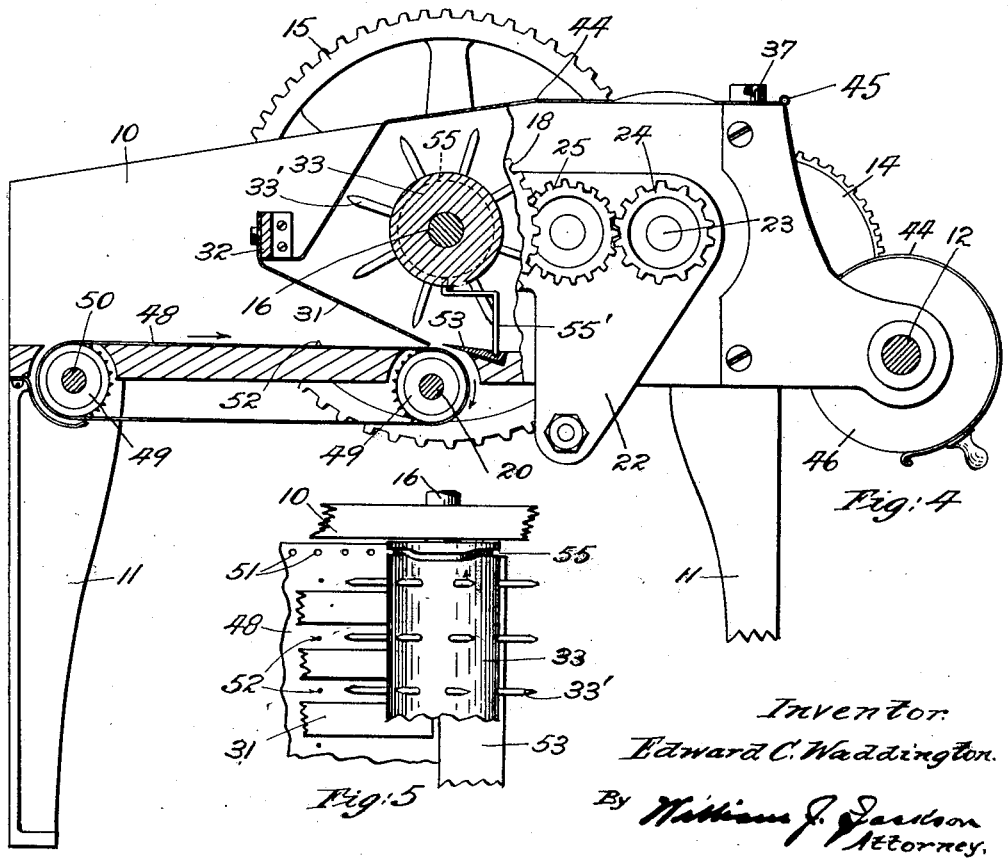

UNITED STATES PATENT OFFICE.

EDWARD C. WADDINGTON, OF WOODSTOWN, NEW JERSEY.

COMBINED CUTTER AND SCRAPER.

1,347,237.  Specification of Letters Patent.  Patented July 20, 1920.

Application filed February 18, 1919. Serial No. 277,865.

*To all whom it may concern:*

Be it known that I, EDWARD C. WADDINGTON, a citizen of the United States, residing at Woodstown, in the county of Salem and State of New Jersey, have invented a certain new and useful Combined Cutter and Scraper, of which the following is a specification.

This invention relates to a machine for cutting into small particles, strips of hog and similar meat having hide adhering thereto.

It is an object of the present invention to provide a machine of this character in which flesh and fat are scraped free of hide and separated therefrom simultaneously with the cutting of strips of hog and similar meat into small particles for domestic purposes. It is a further object of the present invention to provide a simple, practical, efficient, compact and thoroughly reliable machine of this character which may be manufactured and sold at comparatively low cost. Other and further objects reside in the provision of such detailed construction, arrangement and combination of parts as tend to raise the usefulness, commercially considered of the present machine over like apparatus now upon the market.

The invention consists of the improvements hereinafter described and finally claimed.

The nature, characteristic features and scope of the invention will be more fully understood from the following description taken in connection with the accompanying drawings forming part hereof, and in which:—

Figure 1, is a top or plan view of a machine, embodying features of the invention, the machine cover being removed.

Fig. 2, is a view in longitudinal section thereof, taken upon the line 2—2 of Fig. 1.

Fig. 3, is a top or plan view with parts broken away for the purpose of illustrating the scraper construction.

Fig. 4, is a view in side elevation, partly sectioned, showing the embodiment of certain modified arrangements of parts, and Fig. 5, is a fragmentary view, in plan, of certain of the parts shown in Fig. 4.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawings 10, designates a troughlike structure supported upon legs 11. Rotatably supported at one end of the structure 10 is a laterally disposed main driving shaft 12, which may be hand or power driven. Such shaft 12 is provided with a pinion 13, which meshes with an intermediate gearwheel 14 which in turn meshes with a gearwheel 15 fixed to a laterally disposed shaft 16 journaled in the side walls of the structure 10. The shaft 16 has fixed thereto a gear-wheel 17 and a spur-gear 18. The gearwheel 17 is in mesh with a pinion 19 fixed to a shaft 20 which parallels the shaft 16 in a plane therebelow, journaled in brackets 21 see Fig. 3 carried by the structure 10. Pivotally carried by the shaft 16 is a yoke 22. Movable in slots 22' in the side walls of structure 10 and journaled in which yoke is a laterally disposed shaft 23 fixed to which is a pinion 24, motion being imparted thereto through an intermediate pinion 25 journaled to the yoke and meshing with the spur-gear 18 upon shaft 16. By such disposition of gearing shafts 12, 23 and 16 are capable of rotation in the same direction and shaft 20 in the opposite direction. A description will now be given of the various parts carried by and associated with shafts and their functions.

*Scraper.*—Fixed to shaft 20 is a cylinder 26 peripherally provided with laterally spaced, pointed projections or spurs 27. The lower wall or bottom of structure 10 is transversely cut away as at 28 to accommodate rotation of the cylinder and to permit passage of hide, as flesh and fat are separated therefrom, through said cut-away portion 28, a guide 29 being located beneath said cylinder for directing scraped hide away therefrom, see Fig. 2, as drawn inwardly and downwardly by the spurs upon said cylinder.

cated above the cylinder 26 and fixed to the bottom wall of the structure 10 is a transversely disposed knife or scraping blade 30 for severing flesh and fat from hide as passed through the machine. In order that the hog or other meat to be cut may be fed in a flat condition directly to the scraping blade use is made of a plurality of thin metal strips 31 fixed to a cross bar 32 in spaced relation and so inclined that the free ends thereof may rest upon the periphery of cylinder 26 in a yielding manner. With the feeding of hog or other meat to the scraper-blade these strips 31 yield sufficiently to permit of proper feed and at the same time serve to keep the material being fed in abutting position with the bottom of the trough-like structure 10.

*Feed.*—For feeding purposes there is employed a cylinder 33, provided with a plurality of radially disposed pins 33', which cylinder is mounted upon and fixed to the shaft 16. Considered transversely of the machine, these pins are so spaced as to pass between adjacent strips 31, during rotation of shaft 16. The cylinder 33 is mounted immediately above cylinder 26 and the pins are so disposed that during rotation of the cylinder they impinge against and draw the flesh and hide, being fed directly against the scraper-knife whereby the hide is separated from the flsh and delivered through opening 28 and whereby the fleshy portion of the material is fed toward cutting disks 34 about to be described.

*Cutting disks.*—The cutting-disks 34 are fixed to a drum 35 mounted upon shaft 23 and are so spaced that in rotation of the pins 33' the same pass between adjacent cutting-disks 34. The cutting-disks are yieldingly suspended, by reason of the yoke 22, in the following manner. Extended across the trough-like structure 10 and secured in recessed portions of the side walls thereof is a bar 36 secured to place as by screws 37. Fixed to said bar as at 38 are spaced, substantially L-shaped, relatively thin, metallic strips 39 the free ends of which are bifurcated as at 40 for the travel therethrough of the pins 33' during rotation thereof. Positioned as clearly illustrated in Fig. 2 the horizontal portions of these strips or fingers rest beneath and support the drum 35 and the vertical portions of said strips or fingers close the end of the trough-like structure to the entrance of meat thereto above the plane of the horizontally extended, bifurcated parts of said strips or fingers 39. The bifurcated ends of these fingers abut against the underside of drum 33 so that the bottom of the trough-like structure is in effect a tube from A to B in Fig. 2, for the passage therethrough of meat. The bottom of the trough-like structure is cut-away as at 41 in alinement with each cutter-disk 34 in order to provide clearance therefor. As flesh and fat are fed to the cutter-disks for being cut into strips, the fingers 39 serve to maintain such flesh and fat in flat position. Should a piece of meat be unduly thick pressure thereof upon the underside of fingers 39, which are resilient, causes the cutter-disk shaft 23 to move upward slightly through slots 22' to prevent jamming of cutter-disk parts.

*Mincing-knives.*—Suitably secured to the shaft 12 are mincing-knives 42 for cutting the strips of flesh and fat crosswise as they come from the cutter-disks, into small rectangular particles. The mincing knives coöperate with a ledger-bar 43 for effecting a cut of this kind.

The top of the trough-like structure may be provided with a protector or cover 44 of thin metal. In practice such cover is made in two parts, hinged as at 45, one part being fitted at its free end beneath the bar 32 and secured by the screws 37 to the side walls of structure 10 and the other part being fitted at its free end partially around a pair of fixed disk-like members 46 arranged concentrically with shaft 12. A protecting cover 47 may also be placed around the gear-wheels and pinions upon the side of the machine from which the main driving shaft 12 is operated, particularly if the machine be hand driven.

In Figs. 4 and 5 an apron 48 is shown for advancing hide and flesh to the scraper-knife. Upon shafts 20 and 50 are mounted wheels 49 having peripheral projections for engaging in marginal openings 51 in apron 48 for moving same in the direction of the arrow. The apron is provided with a set of laterally disposed pointed projections 52 for engaging with the hide portion of meat being fed to the machine. The purpose of this construction is to avoid profuse perforating of the hide as is the case in the construction shown in Fig. 2. If the hide is to be utilized for making various commodities such profuse perforation is a disadvantage. In Figs. 4 and 5 the scraper-knife 53 is shown as having slight transverse movement in order that the cutting edge thereof be preserved as much as possible from becoming dull. To provide such movement the cylinder 33 upon shaft 16 is provided with a cam-groove 55 tracking in which is a member 55' fixed to the scraper-knife 53 so that once in every revolution of shaft 16 the scraper-knife is shifted laterally of the structure 10.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:—

1. A machine of the character stated comprising a fixed trough-like frame, a horizontally disposed scraper-knife mounted upon the floor of said frame for scraping or cutting the fleshy part of meat from hide, means for slicing said fleshy parts into elongated strips, means for feeding said fleshy parts as removed along the floor of said frame toward said slicing means, a cylinder provided with pointed projections rotatable in a plane below and paralleling said feeding means for guiding said hide beneath the floor of said frame in a direction away from said slicing means and means for cutting said strips into small rectangular particles.

2. A machine of the character stated comprising a fixed trough-like frame, a horizontally disposed scraper-knife mounted upon the floor of said frame for scraping or cutting the fleshy part of meat from hide, means for slicing said fleshy parts into elongated strips, means for feeding said fleshy parts as removed along the floor of said frame toward said slicing means, a cylinder provided with pointed projections rotatable in a plane below and paralleling said feeding means for guiding hide beneath the floor of said frame in a direction away from said slicing means, resilient fingers coöperatively arranged with respect to said feeding means and cylinder for presenting meat to said scraper-knife in flat position, said fingers pressing the meat against the floor of said frame and means for cutting said strips into small particles.

3. A machine of the character stated comprising a fixed trough-like frame, rotatable cutting-disks, a movably mounted yoke for supporting said disks, angular fingers for sustaining said yoke in a yielding manner and between which fingers said disks rotate, the floor of said frame and the lower portions of said fingers forming a tube-like passage for the feeding therethrough of meat, rotatable knives operative for cutting in a direction transversely of the direction of cutting of said disks and means for feeding material to be cut through said tube-like passage toward said disks and knives.

4. A machine of the character stated comprising a fixed trough-like frame the bottom of which is provided with a scraper-knife and is cut away adjacent thereto for the passage of hide therethrough, means above said scraper-knife for feeding meat including the hide toward said scraper-knife, means movable through said cut-away portion of the frame for removing hide as severed from the meat, means for slicing the meat through the cut-away portion of the bottom of said frame into elongated strips mounted in said frame and means for cutting said strips into small rectangular particles operatively carried by said frame.

5. In a machine of the character stated, a fixed trough-like frame, means supported by the floor of said frame for severing fleshy parts from hide; means for slicing said fleshy parts into elongated strips, means for cutting said strips into small rectangular particles, means for feeding said fleshy parts toward the slicing and cutting means, means for withdrawing the hide through the floor of said frame, means including gear wheels meshing with one another for driving said feeding means, slicing means and cutting means in one direction, and means including gear wheels meshing with one another one of which is connected to said feeding means for driving the hide withdrawing means in an opposite direction.

In testimony whereof, I have hereunto signed my name.

EDWARD C. WADDINGTON.